US011846469B2

(12) United States Patent
Lamparelli

(10) Patent No.: US 11,846,469 B2
(45) Date of Patent: Dec. 19, 2023

(54) FLEXIBLE FUEL OIL-LINE ASSEMBLY WITH NOVEL MOUNTING BRACKET

(71) Applicant: Joseph Nicola Lamparelli, Norwell, MA (US)

(72) Inventor: Joseph Nicola Lamparelli, Norwell, MA (US)

(*) Notice: Subject to any disclaimer, the term of this patent is extended or adjusted under 35 U.S.C. 154(b) by 801 days.

(21) Appl. No.: 16/989,372

(22) Filed: Aug. 10, 2020

(65) Prior Publication Data
US 2020/0370832 A1 Nov. 26, 2020

Related U.S. Application Data

(60) Provisional application No. 62/884,811, filed on Aug. 9, 2019.

(51) Int. Cl.
*F27D 1/18* (2006.01)
*F16M 13/02* (2006.01)
*F27D 1/00* (2006.01)

(52) U.S. Cl.
CPC .............. *F27D 1/18* (2013.01); *F16M 13/02* (2013.01); *F27D 2001/0059* (2013.01)

(58) Field of Classification Search
CPC .. F16M 13/00; F27D 1/12; F27D 1/18; F27D 2001/0059; F27D 2009/0002; F27D 2099/0091

USPC ....... 373/60, 71, 122, 128, 130; 219/121.89, 219/85.17

See application file for complete search history.

(56) References Cited

FOREIGN PATENT DOCUMENTS

CN 211380916 U * 9/2020
KR 101346080 B1 * 12/2013

* cited by examiner

*Primary Examiner* — Quang T Van
(74) *Attorney, Agent, or Firm* — Barry Choobin; Patent 360

(57) ABSTRACT

An oil-line assembly for an oil-fired boiler including a bracket, an elongated pipe, a first socket, a second socket, and a flexible hose. The bracket has a first plate member and a second plate member both having a common edge. The elongated pipe is coupled to an edge opposite the common edge of the second plate member and extends along its longitudinal axis parallel to the common edge. The elongated pipe has a proximal end and a distal end. The first socket is secured to the proximal end of the elongated pipe. The free end of the first socket receives an oil-line that extends from oil source. The second socket is coupled to the distal end of the elongated pipe. The proximal end of the flexible hose is coupled to the free end of the second socket and the distal end is coupled to an input of the oil-fired boiler.

17 Claims, 4 Drawing Sheets

FLEXIBLE FUEL OIL-LINE ASSEMBLY WITH NOVEL MOUNTING BRACKET

CROSS-REFERENCE TO RELATED APPLICATIONS

This application claims priority to the U.S. provisional patent application Ser. No. 62/884,811 filed on Aug. 9, 2019, which is incorporated herein by reference in its entirety.

FIELD OF INVENTION

The present invention relates to a fuel oil-line assembly, and particularly, to a fuel oil-line assembly for an oil-fired heating unit such as boilers and furnaces.

BACKGROUND

Oil-fired heating units such as boilers and furnaces continue to be a popular choice for heating homes in wintry weather regions. In recent years, to facilitate full inspection, servicing, and thorough cleaning of oil-fired heating units, boiler and furnace manufacturers have introduced hinged "swing-away" doors on the front of all units to allow for full access to the combustion chambers of the units. Currently, most oil-fired heating unit installers attach the rigid oil-line directly to the valve on the pump of a burner of an oil-fired heating unit as they always have done for past designs. The burner is mounted on a hinged 'swing-away' door. This method does not allow the full functionality of the "swing-away" door to be achieved without physically disconnecting the oil-line each time chamber access is required. Therefore, a long-felt need is there for a solution that allows for the full functionality of the "swing-away" door.

The oil-fired boilers, furnaces and like heating units are hereinafter referred to as the furnaces.

SUMMARY OF THE INVENTION

The principal object of the present invention is therefore directed to an assembly for an oil-line that can be used with a hinged door of the furnace.

It is another object of the present invention that the assembly enhances the functionality of the hinged 'swing-away' door by allowing full access to the heating chamber of the furnace.

It is still another object of the present invention that the assembly does not restrict the opening of the swing away door of the furnace.

It is another object of the present invention that the assembly can easily retrofit to any existing furnace.

In one aspect is disclosed an oil-line assembly for an oil-fired boiler or furnace has a hinged door, the oil-line assembly includes a bracket, an elongated pipe, a first socket, a second socket, and a flexible hose. The bracket having a first plate member, a second plate member, the first plate member, and a second plate member having a common edge. The first plate member and a second plate member can be perpendicularly at the common edge. Alternatively, the first plate member can have an angle between 60-150 degrees relative to the second plate member. The elongated pipe member coupled to an edge opposite the common edge of the second plate member, the elongated pipe member extends along its longitudinal axis which runs parallel to the common edge, the elongated pipe member having a proximal end and a distal end; The first socket secured to the proximal end of the elongated pipe member. The other end of the first socket is configured to receive an oil-line that extends from an oil source. The oil line can be interrupted by a valve which control the flow of the oil. The second socket coupled to the distal end of the elongated pipe member. The flexible hose having a proximal end and a distal end, wherein the proximal end of the flexible hose is coupled to a free end of the second socket, the distal end of the flexible hose configured to couple to an input of the burner.

In one aspect, the first plate member of the bracket is configured to attach to a sidewall of the oil-fired boiler or furnace.

In one aspect, the proximal end and the distal end of the elongated pipe member are configured with female threads. The first socket and the second socket configured with corresponding male threads.

In one aspect, the first socket and the second socket are elbow sockets.

In one aspect, the first plate member is having a plurality of holes configured to receive fasteners. The first socket, the elongated pipe member, the second socket, and the flexible hose are in fluid communication.

In one aspect disclosed is an oil-fired heating system that includes a chamber having a rear wall, sidewalls and an open front; a door coupled to an edge of the open front through a hinge joint allowing the door to be opened and closed; a burner having a pump coupled to an outer surface of the door, the pump having an input port for oil; a bracket having a first plate member, a second plate member, the first plate member and a second plate member having a common edge, the first plate member coupled to a sidewall of the sidewalls of the chamber, the sidewall adjacent the hinge joint; an elongated pipe member coupled to an edge of the second plate member, the edge is opposite the common edge, the elongated pipe member extends along its longitudinal axis which runs parallel to the common edge, the elongated pipe member having a proximal end and a distal end; a first socket secured to the proximal end of the elongated pipe member, the free end of the first socket is configured to receive an oil-line that extends from an oil source; a second socket coupled to the distal end of the elongated pipe member; and a flexible hose having a proximal end and a distal end, wherein the proximal end of the flexible hose is coupled to a free end of the second socket, the distal end of the flexible hose is coupled to the input port of the pump of the burner.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
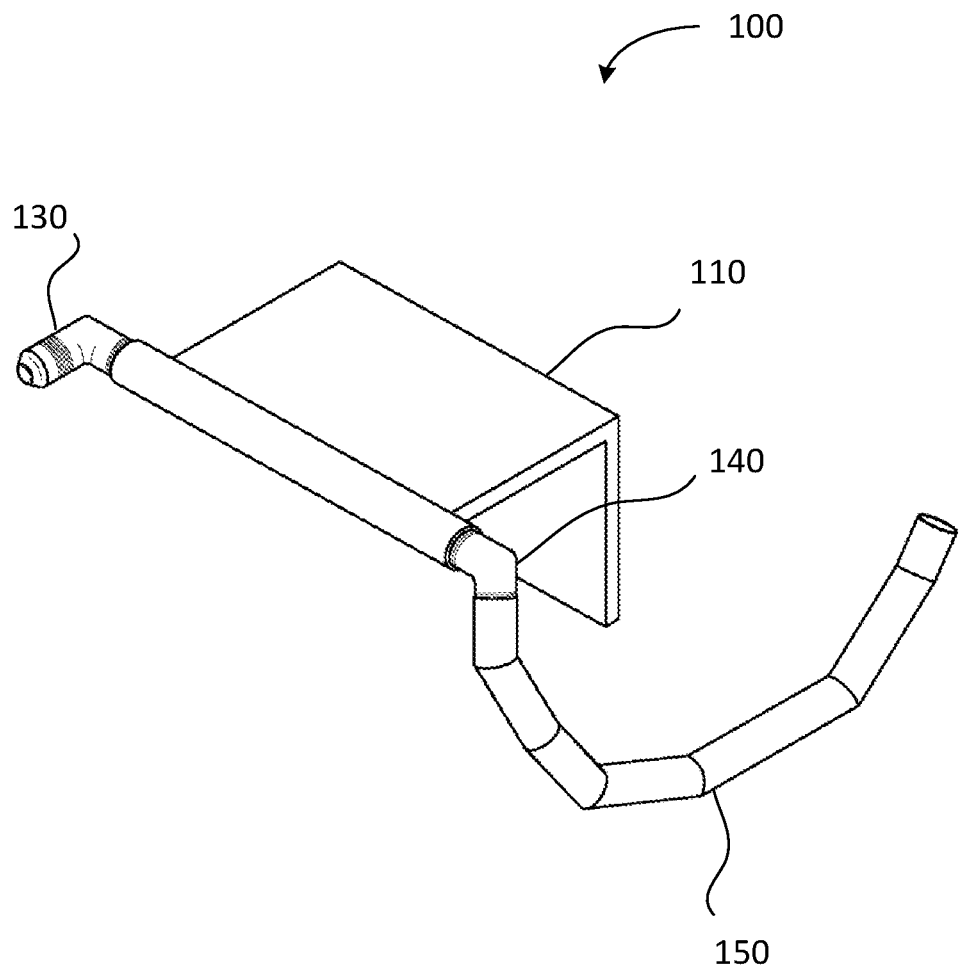
FIG. 1 is a perspective view of an assembly, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as assembly and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth to provide a thorough understanding of the subject innovation. It may be evident, however, that the claimed subject matter may be practiced without these specific details. In other instances, well-known structures and systems are shown in block diagram form to facilitate describing the subject innovation.

Figure 2:
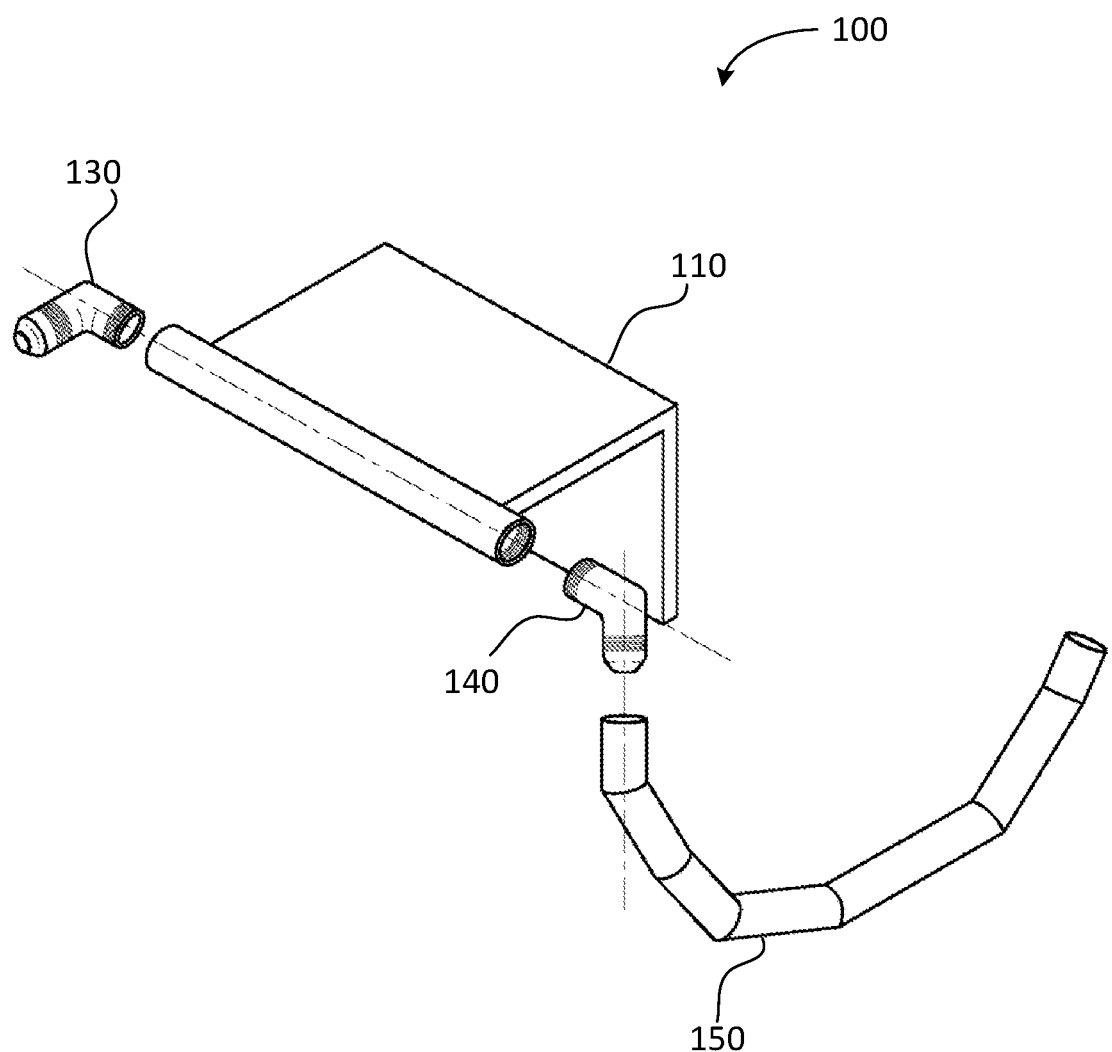
FIG. 2 is an exploded view of the assembly of FIG. 1, according to an exemplary embodiment of the present invention.
Figure 3:
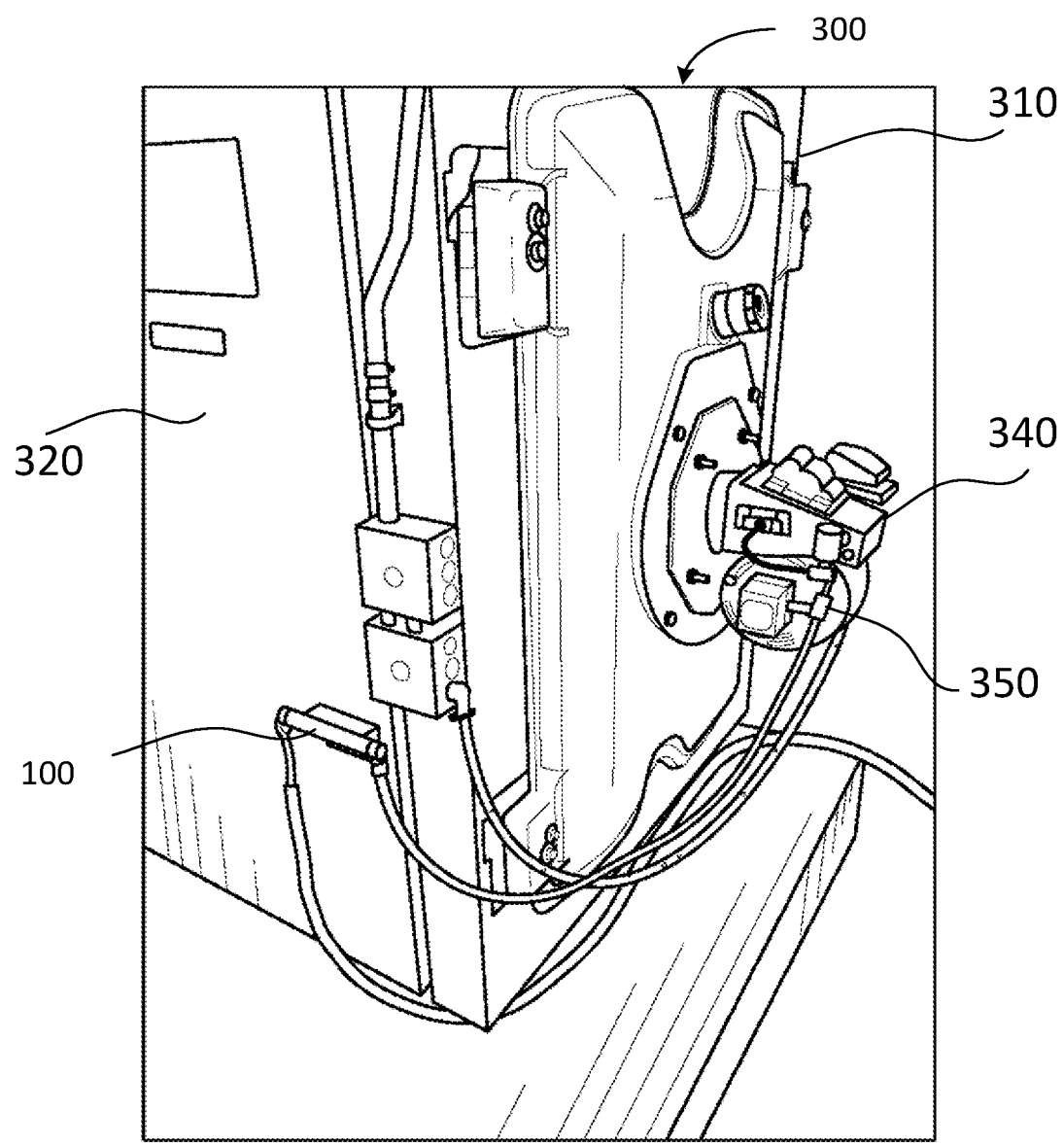
FIG. 3 is a perspective view of the furnace with installed assembly of FIG. 1, according to an exemplary embodiment of the present invention.

The present disclosure is directed to an oil-line assembly for oil-fired boilers and furnaces. Referring to FIG. 1 which shows a perspective view and FIG. 2 which shows an exploded view of the oil-line assembly 100 for the furnaces. The oil-line assembly 100 includes a bracket 110 that can attach to a sidewall of the furnace. Preferably the bracket can be attached to a sidewall of the furnace near the edge of the sidewall close to the hinged door. FIG. 3 shows an exemplary embodiment of the furnace 300 having a chamber 320, a hinged door 310 covering an open front of the chamber 320, and a burner 340 installed at the hinged door 310. The burner 340 includes a pump for oil, wherein the pump includes an input 350 for connecting to the oil line. FIG. 3 shows a flexible hose of the oil line assembly 100 connected to the input 350 of the burner. The bracket 110 of the assembly 100 can be seen in FIG. 3 attached to the sidewall of the chamber 320. The bracket offers a secure intermediary point for a flow of oil. In one case, preferably the bracket can be made of metal material that is both durable and rigid.

Figure 4:
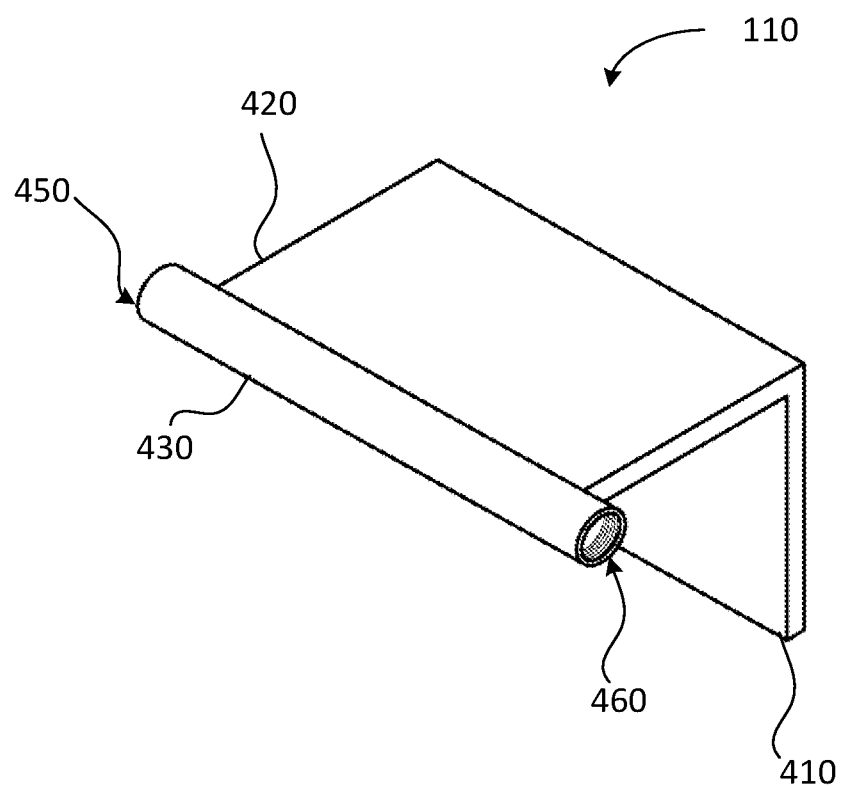
FIG. 4 is a perspective view of the bracket, according to an exemplary embodiment of the present invention

FIG. 4 is a perspective view of the bracket 110 that is of an angle shaped configuration having a first plate member 410 and a second plate member 420 perpendicular to the first plate member 410. The first plate member can also be referred herein as the vertical panel. Similarly, the second plate member can also be referred herein as the lateral panel. A pipe member 430 coupled along its length to an edge of the second plate member 420. The pipe member 430 is of a prolonged shape that is coupled to an edge opposite the corner edge i.e. the edge that is common to the first plate member 410 and the second plate member 420. The opposite ends of the pipe member 430, including a proximal end 450 and a distal end 460, are configured with female threads. The first plate member can have holes that can be used to mount the bracket 110 to the sidewall of the chamber. Perhaps fasteners can be inserted through the holes, wherein the fasteners can secure to the sidewall of the chamber. It is, however, obvious that two or more holes can be configured in the first plate member. For example, the number of holes can be three or four. Additionally, the bracket can be mounted to the sidewall of the chamber using any other method known to a skilled person for attaching metallic angles to a metallic wall. For example, an adhesive can be used to attach the bracket to the sidewall of the chamber. In one case, the first plate member can be about 4 inches wide and 2.5 inches long. The second plate member can also be of dimensions like the first plate member. However, it is to be understood that the size of the bracket can be easily varied without departing from the scope of the present disclosure. For example, a smaller size bracket made of sturdier material can function like the above-dimensioned bracket. Similarly, the dimensions of the first plate member can be different from the second plate member. Additionally, the length of the pipe member can be also be varied without departing from the scope of the present invention. Also, it is to be understood that the edges of the first plate member and the second plate member can be sharp, rounded, or beveled. Also, the first plate member should preferably be flat, the second plate member can be of a configuration ranging from flat to curved. Moreover, the bracket has been described as to be made of metal, however, the use of any oil-resistant materials, such as plastics is within the scope of the present invention. Furthermore, FIG. 4 shows the end of the pipe member having threads, any other mechanism for sealably coupling two metal pipes or two plastic pipes can be used without departing from the scope of the present invention.

Referring again to FIGS. 1 and 2, the oil-line assembly 100 further includes a first socket 130, a second socket 140, and the flexible hose 150. The oil-line assembly 100 can optionally include a valve that can be coupled to the proximal end of the pipe member 430 through the socket 130. The valve can be a glove valve, it is, however, obvious that any other type of value for regulating the flow of oil can be used without departing from the scope of the present invention. The socket 130 illustrated in FIGS. 1 and 2 is an elbow socket. However, the use of any other socket is within the scope of the present invention. The socket 140 shown in FIGS. 1 and 2 is an elbow socket. However, the use of any other socket is within the scope of the present invention. The flexible hose 150 is having a proximal end and a distal end. The proximal end of the flexible hose 150 can be seen in FIGS. 1 and 3 to be connected to the second socket 140, such as the first socket, the pipe member, the second socket, and the flexible hose are in fluid communication.

In one implementation, the oil-line carrying the oil from the oil source can be connected to the free end of the first socket. Alternatively, if valve is present, the oil line can be coupled to input port of the valve. The distal end of the flexible hose can be connected to the pump of the burner. Alternatively, if the valve is attached to the pump of the burner, the distal end of the flexible hose can be connected to the input port of the valve. The flexibility of the flexible hose allows the door of the furnace to open easily. No dismantling of the oil-line may be required for gaining access into the furnace through the door. The flexible hose can be made of any oil-resistant material that is durable. Moreover, the length of the flexible hose can be varied without departing from the scope of the present invention.

Although the invention has been explained in relation to its preferred embodiment, it is to be understood that many other possible modifications and variations can be made without departing from the spirit and scope of the invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An oil-line assembly for an oil-fired boiler or furnace having a hinged door, the oil-line assembly comprising:
   a bracket having a first plate member, a second plate member, the first plate member and the second plate member having a common edge;
   an elongated pipe member coupled to an edge opposite the common edge of the second plate member, the elongated pipe member extends along its longitudinal axis which runs parallel to the common edge, the elongated pipe member having a proximal end and a distal end;
   a first socket secured to the proximal end of the elongated pipe member;
   a second socket secured to the distal end of the elongated pipe member; and
   a flexible hose having a proximal end and a distal end, wherein the proximal end of the flexible hose is coupled to a free end of the second socket, the distal end of the flexible hose configured to couple to an input of an oil-fired burner.

2. The oil-line assembly of claim 1, wherein the first plate member of the bracket is configured to couple to a sidewall of the oil-fired boiler or furnace.

3. The oil-line assembly of claim 1, wherein the proximal end and the distal end of the elongated pipe member are configured with female threads, the first socket and the second socket configured with corresponding male threads.

4. The oil-line assembly of claim 1, wherein the first socket is an elbow socket.

5. The oil-line assembly of claim 1, wherein the second socket is an elbow socket.

6. The oil-line assembly of claim 1, wherein the first plate member is having a plurality of holes configured to receive fasteners.

7. The oil-line assembly of claim 1, wherein the first socket, the elongated pipe member, the second socket, and the flexible hose are in fluid communication.

8. The oil-line assembly of claim 1, wherein the first plate member and a second plate member are perpendicularly at the common edge.

9. The oil-line assembly of claim 1, wherein the first plate member is having an angle between 60-150 degrees relative to the second plate member.

10. An oil-fired heating system comprising:
    a chamber having a rear wall, sidewalls, and an open front;
    a door coupled to an edge of open front through a hinge joint allowing the door to be opened and closed;
    a burner coupled to an outer surface of the door, the burner having an oil pump, the oil pump having an input for oil;
    a bracket having a first plate member, a second plate member, the first plate member and the second plate member having a common edge, the first plate member coupled to a sidewall of the sidewalls of the chamber;
    an elongated pipe member coupled to an edge of the second plate member, the edge is opposite the common edge, the elongated pipe member extends along its longitudinal axis which runs parallel to the common edge, the elongated pipe member having a proximal end and a distal end;
    a first socket secured to the proximal end of the elongated pipe member;
    a second socket secured to the distal end of the elongated pipe member; and
    a flexible hose having a proximal end and a distal end, wherein the proximal end of the flexible hose is coupled to a free end of the second socket, the distal end of the flexible hose is coupled to the input of the oil pump.

11. The oil-fired heating system of claim 10, wherein the proximal end and the distal end of the elongated pipe member are configured with female threads, the first socket and the second socket configured with corresponding male threads.

12. The oil-fired heating system of claim 10, wherein the first socket is an elbow socket.

13. The oil-fired heating system of claim 10, wherein the second socket is an elbow socket.

14. The oil-fired heating system of claim 10, wherein the oil-fired heating system is an oil-fired heating furnace.

15. The oil-fired heating system of claim 10, wherein the first plate member and a second plate member are perpendicularly at the common edge.

16. The oil-fired heating system of claim 10, wherein the first plate member is having an angle between 60-150 degrees relative to the second plate member.

17. The oil-fired heating system of claim 10, wherein a free end of the first socket is coupled to an oil line that extends from an oil source.

* * * * *